Feb. 16, 1932.  E. G. GILSON  1,845,789

THRUST BEARING

Filed Oct. 27, 1926

Inventor:
Emery G. Gilson,
by
His Attorney.

Patented Feb. 16, 1932

1,845,789

UNITED STATES PATENT OFFICE

EMERY G. GILSON, OF COLONIE, NEW YORK, ASSIGNOR TO GENERAL ELECTRIC COMPANY, A CORPORATION OF NEW YORK

THRUST BEARING

Application filed October 27, 1926. Serial No. 144,604.

The present invention relates to machine bearings and more especially to bearings of the thrust type, such as are designed to resist end pressure of a rotating part.

The object of my invention is to provide an improved thrust bearing which shall consist of few and simple parts, which shall operate satisfactorily and with low frictional losses under severest conditions of load and high speed, and which may be installed and maintained in operative condition without special pains or adjustment of parts.

Figure 1:
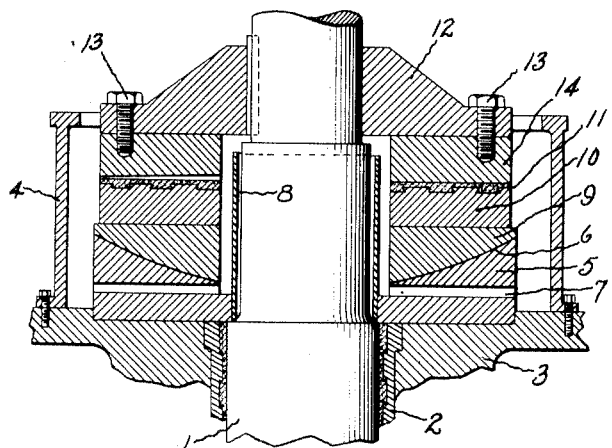
Figure 2:
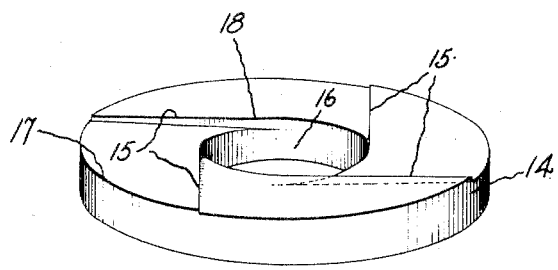

One embodiment of the invention is shown in the accompanying drawings, in which Fig. 1 is a vertical section of a thrust bearing for a vertical shaft, and Fig. 2 is a perspective view of the runner thereof with the surface contour greatly exaggerated for clearness of illustration.

A commonly accepted theory of lubrication of bearings is that by reason of capillary attraction between the viscous lubricant and the moving member, the former is dragged between the rubbing surfaces whereby they are separated by a wedge-shaped fluid film of lubricant and held out of metallic contact by the hydrostatic pressure of the film of lubricant, and whatever heat is developed in operation is that due to the friction between the molecules of the lubricant. It is well known that heat, by reason of its action to lessen the viscosity of the lubricant, and the pressure imposed by the rotary member, cooperates therewith to the attenuation of the fluid oil film and thus tends to its destruction or breakdown. Moreover, heating of the lubricant causes rapid oxidation thereof and consequent impairment of its lubricating value.

Where thrust bearings operate under heavy duty and high speed, it is common practice to flood them in a bath of lubricant which is either circulated through cooling apparatus or else cooling pipes are directly installed in the bath to keep the temperature of the lubricant and the bearing members down to safe limits.

As thrust bearings have been constructed heretofore, the metal of the bearing members has been almost entirely relied upon to conduct away the heat generated in the oil film between them. However, where the operating speeds are high, the heat is often generated faster than the metal can conduct it away and in consequence the bearing members become mere accumulators of heat in spite of the fact that they are surrounded by a bath of lubricant having a comparatively low temperature.

I have found it to be entirely practicable to so construct the rubbing surfaces of a thrust bearing that the lubricant is circulated between them in sufficient quantity and in proportion to the speed at which they run to carry off the heat as generated and avoid practically all dependence on the metal parts to conduct it away from the bearing surfaces.

In the construction of thrust bearing shown in the drawings, the shaft 1 is centered in a guide bearing 2 carried by a pedestal 3, to the upper surface of which a cylindrical outer shell 4 of the oil bath reservoir is secured. On the pedestal 3 is mounted a ring-shaped block 5 having a spherical seat 6 at its upper side and oil passages 7 extending radially through it, and at its inner edge is attached a cylindrical shell 8 which forms a central wall of the oil reservoir and through which the shaft 1 extends freely. A washer 9 with spherical lower surface fits upon the seat 6 in the block 5 and a stationary ring-shaped bearing plate or member 10 rests upon the washer 9 and has a plain babbitted upper surface 11 without grooves or other forms of oil passages. The shaft 1 has a flange 12 fixed thereto and to the under side of the flange is attached by bolts 13 the movable bearing member or runner 14. The reservoir will ordinarily be maintained filled with oil to a level just above the upper surface 11 of the stationary bearing member 10.

The runner 14 is shown in Fig. 2 in inverted position. The bearing surface is divided into quadrants by the removal of portions of the metal beginning at lines 15 disposed in this case tangential to the inner periphery 16 and gradually tapering off along helical outer and inner peripheral guide lines 17 and 18 toward the following segment. The depth at which the metal is removed adjacent the lines 15, which is in any case only a few mils, is much less at the outer periphery than at the inner so that as the runner rotates the oil under centrifugal action enters freely from the center of the bearing into the transverse wedge-shaped spaces adjacent the lines 15 between the stationary and movable members 10 and 14, but is throttled or resisted in its outward passage between them by the contraction of the initial spaces toward the outer periphery, so that such initial spaces become completely flooded with oil and the latter is forced into intimate contact with the adjacent surfaces of both bearing members.

As the runner rotates the oil is carried around by its capillary adhesion thereto and forms annularly tapering films between the bearing members. However, on account of the warped or helically-shaped surfaces on the runner the hydrostatic pressure in the films increases more rapidly near the inner periphery than at points radially outward therefrom, since the inclination of the warped surfaces is most abrupt at the inner periphery, and such difference in pressures naturally operates to force the oil radially outward, thus maintaining the flow of the oil crosswise of the bearing surfaces after the capillary resistance to the outward flow thereof exceeds the centrifugal action thereon. The full flood delivery of oil between the two bearing members, together with its radial escape under pressure therefrom, insures a free and rapid renewal thereof and a minimizing of the time period that any particle is subjected to the accumulation of heat with the result that no particle of oil is raised to the point of carbonization. Furthermore, there is substantially less heat conducted to and through the bearing members and the total friction developed is substantially less than in other forms of thrust bearings.

While I have shown and described the best embodiment of the invention known to me, I do not desire to be restricted thereto.

What I claim as new and desire to secure by Letters Patent of the United States, is,—

1. A thrust bearing comprising a runner ring provided in its rubbing side with recesses beginning at distributed lines of division tangential to the inner periphery of the ring and each recess gradually tapering off in helicoidal surfaces up to the succeeding line of division.

2. A thrust bearing comprising a runner ring provided on its rubbing side with recesses beginning at distributed lines of division thereacross, the depth of said recesses being greatest at the inner periphery of the ring and each recess gradually tapering off in helicoidal surfaces up to the succeeding line of division.

3. A thrust bearing comprising a stationary member provided with a plain rubbing surface and a runner ring member provided over its entire rubbing side with wedge-shaped recesses made deeper at the inner periphery of the ring than at the outer periphery.

4. A thrust bearing comprising a stationary member provided with a plain rubbing surface, a runner ring member having over the entire rubbing side thereof wedge-shaped oil receiving recesses made deepest and their inclination greatest at the inner periphery, and means to supply oil to the inner periphery of said ring whereby rotation of the runner ring may act centrifugally upon the oil to force it into said recesses under pressure and hydrostatically to force it outwardly from between the rubbing surfaces.

5. A thrust bearing comprising an annular rubbing member with a plane surface and a second annular rubbing member cooperating therewith and having its active surface in the form of a series of helicoidally warped surfaces of greater pitch inwardly than radially toward the outer periphery thereof.

In witness whereof, I have hereunto set my hand this 25th day of October, 1926.

EMERY G. GILSON.